US012411857B2

(12) United States Patent
Chaudhuri et al.

(10) Patent No.: US 12,411,857 B2
(45) Date of Patent: Sep. 9, 2025

(54) RECOMMENDING AGGREGATE QUESTIONS IN A CONVERSATIONAL DATA EXPLORATION

(71) Applicant: International Business Machines Corporation, Armonk, NY (US)

(72) Inventors: Ritwik Chaudhuri, Bangalore (IN); Rajmohan Chandrahasan, Perunagar (IN); Kirushikesh DB, Salem (IN); Arvind Agarwal, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 18/164,992

(22) Filed: Feb. 6, 2023

(65) Prior Publication Data
US 2024/0265020 A1  Aug. 8, 2024

(51) Int. Cl.
*G06F 16/2457* (2019.01)
*G06F 16/22* (2019.01)

(52) U.S. Cl.
CPC ...... *G06F 16/24578* (2019.01); *G06F 16/221* (2019.01)

(58) Field of Classification Search
CPC .................. G06F 16/24578; G06F 16/221
See application file for complete search history.

(56) References Cited

U.S. PATENT DOCUMENTS

| | | | |
|---|---|---|---|
| 9,971,967 | B2 | 5/2018 | Bufe, III et al. |
| 11,847,424 | B1* | 12/2023 | Harkous ............... G06N 20/00 |
| 2014/0075334 | A1* | 3/2014 | Dror .................... G06F 16/337 715/753 |
| 2015/0169544 | A1 | 6/2015 | Bufe, III et al. |
| 2015/0371548 | A1* | 12/2015 | Samid .................... G09B 7/08 434/353 |
| 2017/0235848 | A1* | 8/2017 | Van Dusen ........ G06Q 30/0201 705/12 |
| 2019/0164063 | A1* | 5/2019 | Moura ................... G06N 5/022 |
| 2019/0272296 | A1* | 9/2019 | Prakash ............... G06F 16/243 |
| 2020/0134019 | A1* | 4/2020 | Podgorny ............. G06N 3/044 |
| 2020/0159772 | A1* | 5/2020 | Zoumpoulakis ...... G06F 16/907 |

(Continued)

OTHER PUBLICATIONS

Authors et al.: Disclosed Anonymously, "Method for Generating, Selecting, and Ranking Natural Language Modifiers as Starting Points for Datasets in Business Intelligence Systems", IP.com No. IPCOM000264234D, IP.com Electronic Publication Date: Nov. 24, 2020, 4 pages.

(Continued)

*Primary Examiner* — Angelica Ruiz
(74) *Attorney, Agent, or Firm* — Jeffrey M. Ingalls (57) ABSTRACT

Embodiments of the present invention provide an approach for exploring interesting data patterns in structured tables through recommending aggregate questions in a conversational data exploration. Specially, interesting features and operators are selected that are used to frame aggregate questions based on user intent and the data. The aggregate questions are ranked based on user persona and interestingness of the questions. The approach dynamically adapts and improves the recommendation of interesting and relevant aggregate questions for the user based on user feedback iteratively.

17 Claims, 10 Drawing Sheets

(56) References Cited

U.S. PATENT DOCUMENTS

2021/0019309 A1* 1/2021 Yadav ................. G06F 16/2428
2021/0374168 A1* 12/2021 Srinivasan ............. G06V 10/82

OTHER PUBLICATIONS

Arjun Srinivasan et al., "Snowy: Recommending Utterances for Conversational Visual Analysis", Publication Date Oct. 12, 2021, pp. 864-880.
Saichandra Pandraju et al., "Answer-Aware Question Generation from Tabular and Textual Data using T5", Publication Date Sep. 20, 2019, pp. 256-267.
Kedar Dhamdhere et al., "Analyza: Exploring Data with Conversation", Publication Date Mar. 7, 2017, pp. 493-504.
Zhihui Yang et al., "iExplore: Accelerating Exploratory Data Analysis by Predicting User Intention", Publication Date May 12, 2018, pp. 149-165.
Milo, "Automating Exploratory Data Analysis via Machine Learning: An Overview", SIGMOD '20, Jun. 14-19, 2020, Portland, OR, USA, 6 pgs.
Milo, "Deep Reinforcement-LearningFramework for Exploratory Data Analysis", aiDM'18, Jun. 10, 2018, Houston, TX, USA, 4 pgs.
Vartak et al., "Efficient Data-Driven Visualization Recommendations to Support Visual Analytics", Proceedings VLDB Endowment. Sep. 2015 ; 8(13): 2182-2193, 41 pgs.
Singh, Exploratory Data Analysis with Tableau, Proceedings VLDB Endowment. Sep. 2015 ; Proceedings VLDB Endowment. Sep. 2015, www.pluralsight.com/guides/exploratory-data-analysis-with-tableau, Jun. 24, 2020, 12 pgs.
Microsoft, "Turn your data into immediate impact", https://powerbi.microsoft.com/en-au/, Oct. 2022, 12 pgs.

* cited by examiner

| Customer ID | Country | State | Gender | Age | Salary | Month-Year | Credit Expenditure | Due Date of Payment | Actual Date of Payment |
|---|---|---|---|---|---|---|---|---|---|
| C1 | US | NC | Male | 31 | $100000 | April-2022 | $7500 | 15/05/2022 | 08/05/2022 |
| C2 | US | NC | Female | 28 | $80000 | April-2022 | $10000 | 15/05/2022 | 20/05/2022 |

Table 1

| Customer ID | Dependent Count | Marital Status |
|---|---|---|
| 12112 | 2 | Single |
| ... | ... | ... |

Table 2

| Employee ID | Termination Date | Job Title |
|---|---|---|
| 1 | 2014-12-30 | Developer |
| ... | ... | ... |

RECOMMENDING AGGREGATE QUESTIONS IN A CONVERSATIONAL DATA EXPLORATION

TECHNICAL FIELD

The present invention relates to data retrieval, and more specifically to embodiments for retrieving data by exploring interesting data patterns in structured tables through recommending aggregate questions in a conversational data exploration.

BACKGROUND

Conversational data exploration is the process of accessing a database using the everyday language one would employ in a conversation with another human. This can be done across a wide range of communications channels and message types, including emails, chats and even calls. Conversational data exploration can be done over multiple media where various data insights are provided to the user in a conversational setup.

SUMMARY

Embodiments of the present invention provide an approach for retrieving data by exploring interesting data patterns in structured tables through recommending aggregate questions in a conversational data exploration. Specially, interesting features and operators are selected that are used to frame aggregate questions based on user intent and the data. The aggregate questions are ranked based on user persona and interestingness of the questions. The approach dynamically adapts and improves the recommendation of interesting and relevant aggregate questions for the user to access database data based on user feedback iteratively.

A first aspect of the present invention provides a method for retrieving data in a conversational data exploration, comprising: receiving, by a processor, a dataset and metadata related to the dataset; calculating, by the processor, an importance score for each column within the dataset; selecting, by the processor, a set of the columns based on the importance score of each column; generating, by the processor, a list of operators, wherein an operator is generated for each column within the set of columns; generating, by the processor, a set of questions based on the set of columns, the list of operators, and the metadata; calculating, by the processor, a ranking score for each question within the set of questions; ranking, by the processor, the set of questions based on the ranking score; and presenting, by the processor, a set of relevant questions from the set of questions based on a predefined threshold.

A second aspect of the present invention provides a computing system for retrieving data in a conversational data exploration, comprising: a processor; a memory device coupled to the processor; and a computer readable storage device coupled to the processor, wherein the storage device contains program code executable by the processor via the memory device to implement a method, the method comprising: calculating, by the processor, an importance score for each column within the dataset; selecting, by the processor, a set of the columns based on the importance score of each column; generating, by the processor, a list of operators, wherein an operator is generated for each column within the set of columns; generating, by the processor, a set of questions based on the set of columns, the list of operators, and the metadata; calculating, by the processor, a ranking score for each question within the set of questions; ranking, by the processor, the set of questions based on the ranking score; and presenting, by the processor, a set of relevant questions from the set of questions based on a predefined threshold.

A third aspect of the present invention provides a computer program product for retrieving data in a conversational data exploration, the computer program product comprising a computer readable storage device, and program instructions stored on the computer readable storage device, to: calculate, by a processor, an importance score for each column within a dataset; select, by the processor, a set of the columns based on the importance score of each column; generate, by the processor, a list of operators, wherein an operator is generated for each column within the set of columns; generate, by the processor, a set of questions based on the set of columns, the list of operators, and metadata related to the dataset; calculate, by the processor, a ranking score for each question within the set of questions; rank, by the processor, the set of questions based on each ranking score; and present, by the processor, a set of relevant questions from the set of questions based on a predefined threshold.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
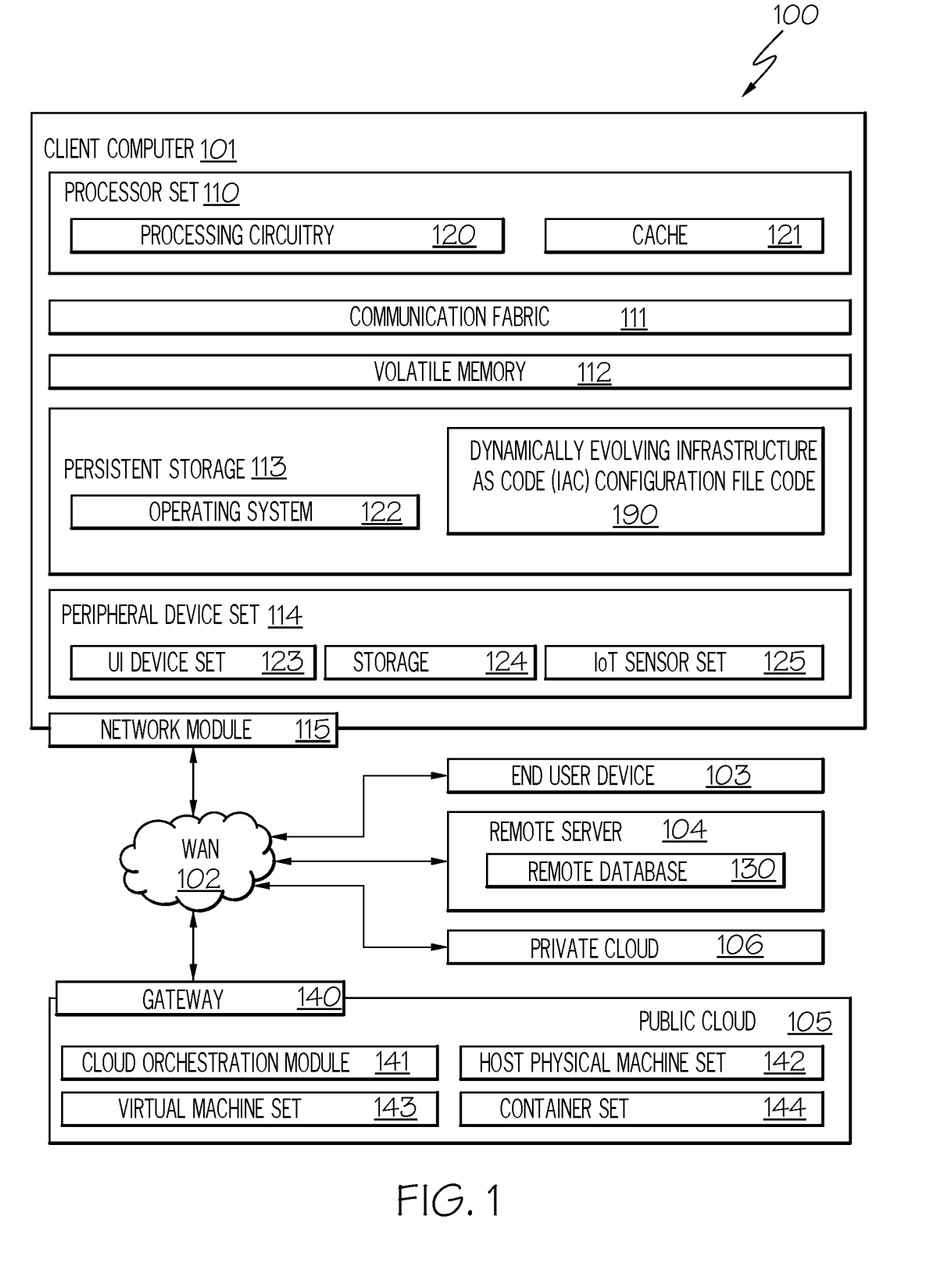
FIG. 1 depicts a block diagram illustrating an example of an environment for the execution of at least some of the computer code involved in performing the inventive methods, in accordance with embodiments of the present invention.

Computing environment 100 of FIG. 1 contains an example of an environment for the execution of at least some of the computer code involved in performing the inventive methods, such as exploring interesting data patterns in structured tables through recommending aggregate questions in a conversational data exploration 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Conversational data analysis can be important because it fills a major gap in business understanding and process efficiency. Essential to a business to run successfully is good communication. Many operational processes and workflows involve human interaction—primarily digital—at some point. Given a dataset, exploratory data analysis and retrieval can be a challenging task for non-technical users. Even for technical users, exploratory data analysis and retrieval might involve complex tasks like mining out relevant information from appropriate portions or slices of data and then providing an analysis for the same. There are few existing tools today which automatically perform some preliminary data analysis by generating plots with one, two variables, correlation measures, etc. However, it is difficult for a non-technical user to choose the right plot and then understand the relevant parts from the plot. Also, for a non-technical user, it is difficult to choose which plot to look at.

The proposed delivery mechanism is an artificial intelligence (AI) enabled system that explores data patterns and data fields across one or more tables or datasets through aggregate questions based on user intent. Given a tabular dataset, a determination can be made as to what the relevant questions are that can be generated using the metadata of the dataset (e.g., such as column headers, description of the dataset, title of the dataset) in addition to the cell values in the dataset. Machine learning is seen as a part of artificial intelligence. Machine learning is a field of inquiry devoted to understanding and building methods that 'learn', that is, methods that leverage data to improve performance on some set of tasks. Machine learning involves a training step. Training is an important step in machine learning. In training, prepared data is passed to the machine learning algorithm (or model) to find patterns and make predictions. It results in the model learning from the data so that it can accomplish the task set. Over time, with training, the algorithm gets better at predicting as it receives additional data in the future.

Figure 2:
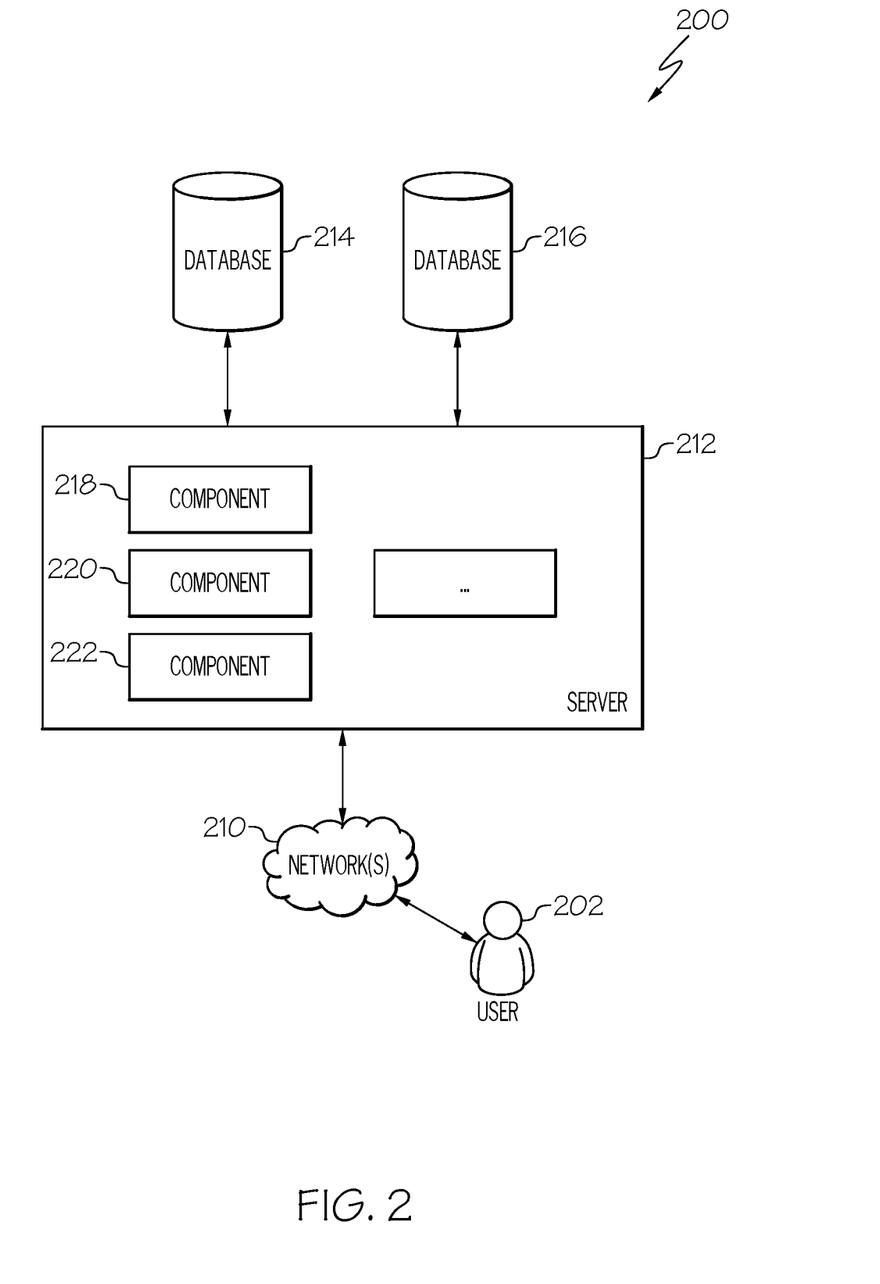
FIG. 2 depicts a block diagram of a distributed system involved in performing the inventive methods, in accordance with embodiments of the present invention.

FIG. 2 depicts a block diagram of a distributed system 200 for implementing one or more of the embodiments. In the illustrated embodiment, distributed system 200 includes one or more users 202, who execute and operate a client application such as a web browser, proprietary client, or the like over one or more network(s) 210. Server 212 may be configured to communicate with user 202. In various embodiments, server 212 may be adapted to run one or more services or software applications provided by one or more of the components 218, 220, 222 of the system. In some embodiments, these services may be offered as web-based or cloud services or under a Software as a Service (SaaS) model to user 202.

In the configuration depicted in FIG. 2, the software components 218, 220, and 222 of system 200 are shown as being implemented on server 212. Users 202 may utilize one or more client applications to use the services provided by these components 218, 220, and 222. These components 218, 220, and 222 may be implemented in hardware, firmware, software, or combinations thereof. It should be appreciated that various different system configurations are possible, which may be different from distributed system 200. The embodiment shown in the figure is thus one example of a distributed system for implementing an embodiment system and is not intended to be limiting. Although exemplary distributed system 200 is shown with one user 202, any number of users may be supported.

Network(s) 210 in distributed system 200 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. For example, network(s) 210 can be a local area network (LAN), such as one based on Ethernet, Token-Ring and/or the like. Network (s) 210 can be a wide-area network and/or the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 212 may be adapted to run one or more services or software applications described in the foregoing disclosure. For example, server 212 may correspond to a server for performing processing described above according to an embodiment of the present disclosure.

In some implementations, server 212 may include one or more applications to analyze and consolidate data feeds and/or event updates received from user 202. As an example, data feeds and/or event updates may include, but are not limited to, real-time updates received from one or more third party information sources and/or continuous data streams, which may include real-time events related to sensor data applications, network performance measuring tools (e.g., network monitoring and traffic management applications), clickstream analysis tools, automobile traffic monitoring, and/or the like. Server 212 may also include one or more applications to display the data feeds and/or real-time events via one or more display devices of user 202.

Distributed system 200 may also include one or more databases 214 and 216. Databases 214 and 216 may reside in a variety of locations. In an example, one or more of databases 214 and 216 may reside on a storage medium local to (and/or resident in) server 212. Alternatively, databases 214 and 216 may be remote from server 212 and in communication with server 212 via a network-based or dedicated connection. In one set of embodiments, databases 214 and 216 may reside in a storage-area network (SAN). Similarly, any necessary files for performing the functions attributed to server 212 may be stored locally on server 212 and/or remotely, as appropriate. In one set of embodiments, databases 214 and 216 may include relational databases that are adapted to store, update, and retrieve data in response to computing language commands.

As stated, the approach disclosed herein includes retrieving data by exploring interesting data patterns in structured tables through recommending aggregate questions in a conversational data exploration. Specially, interesting features and operators are selected that are used to frame aggregate questions based on user intent and the data. The aggregate questions are ranked based on user persona and interestingness of the questions. The approach dynamically adapts and improves the recommendation of interesting and relevant aggregate questions for the user to access database data based on user feedback iteratively. The approach is described in greater detail below.

Figure 3:
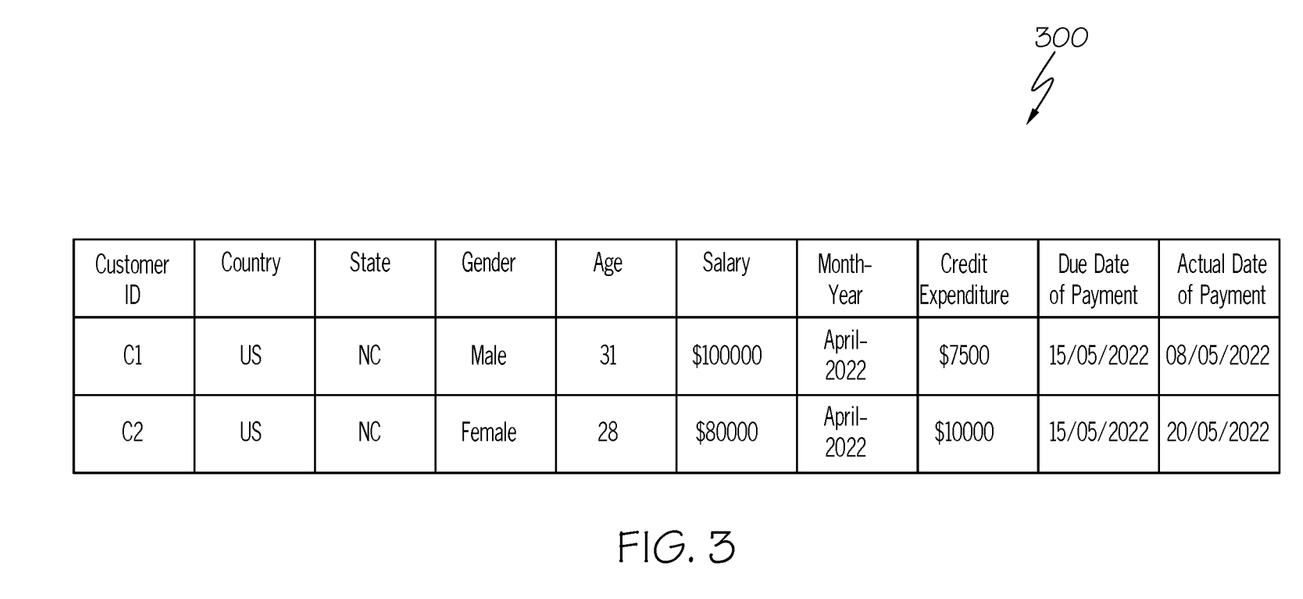
FIG. 3 depicts an example database involved in performing the inventive methods, in accordance with embodiments of the present invention.

FIG. 3 depicts an example dataset 300 having the following columns/information: Customer ID, Country, State, Gender, Age, Salary, Month-Year, Credit Expenditure, Due Date of Payment, and Actual Date of Payment. Some of the questions which might be relevant for a data scientist are: "What is the average credit expenditure based on salary?", "What is the average salary based on age?", "What fraction of the customers have a credit expenditure more than $6000 based on state?", "What fraction of customers have delayed their payment by states?", and "What is the average number of days the payment is delayed by the customers who have their salary above third quartile in the distribution of salaries?". A question which might be relevant for a credit lending manager is: "What is the credit limit for a customer with salary $70000 and age less than 30?".

An embodiment of the present disclosure generates a set of relevant questions based on a dataset for which the data owner might want the answer. It provides the relevant questions to the data owner based on his/her roles, responsibilities, and persona. Some questions which are relevant for a data scientist could be very different from a credit lending manager. If a list of tables is provided as an input along with a schema description, the embodiment can generate a set of relevant/interesting questions spanning over multiple column headers across multiple tables based on the roles/responsibilities of the user. Within the interactive setup based on the user choices of the interesting question, the embodiment can predict the intent of the user in every iteration and present more relevant/interesting questions to the user.

Figure 4:
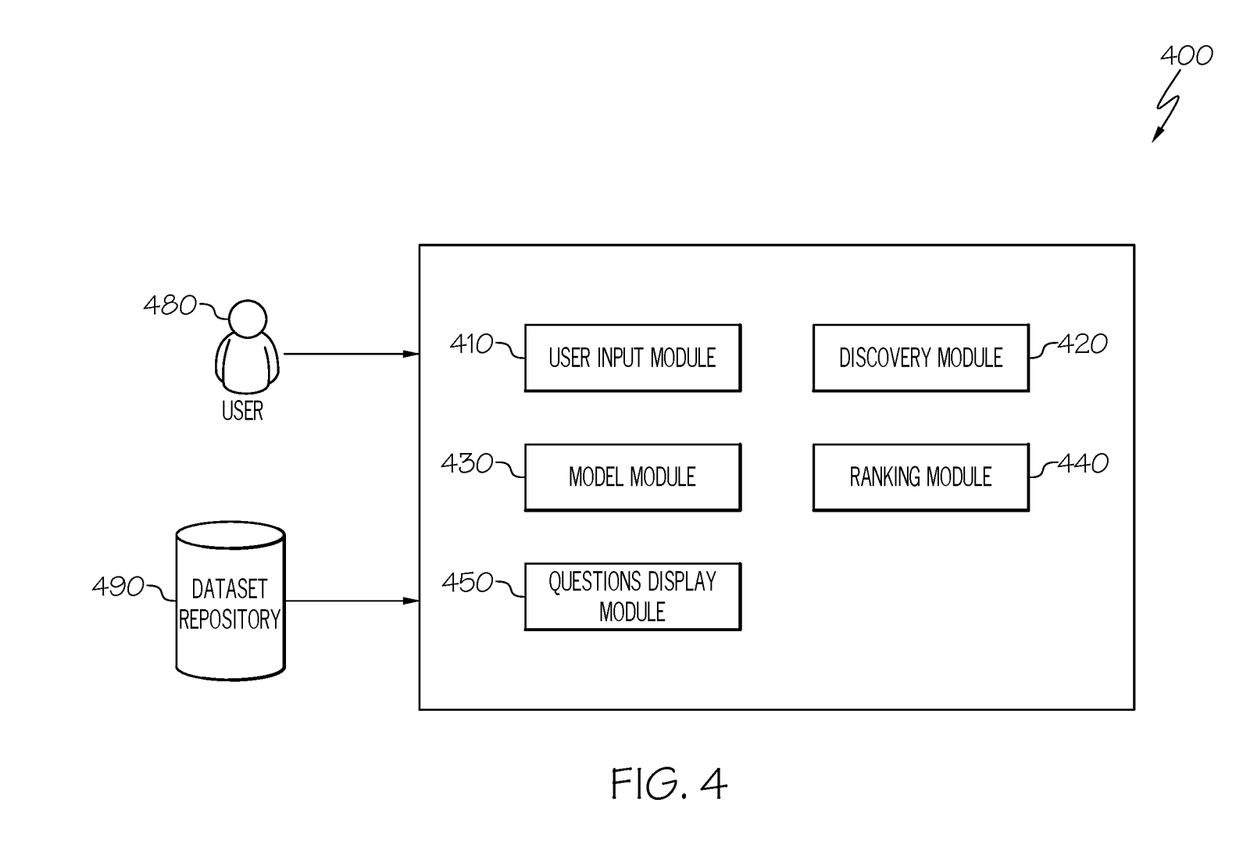
FIG. 4 depicts a block diagram of one or more components of a system environment by which services provided by one or more components of an embodiment system may be offered as cloud services, in accordance with an embodiment of the present invention.

FIG. 4 depicts a block diagram of one or more components of a system environment 400 by which services provided by one or more components of an embodiment system may be offered as cloud services, in accordance with an embodiment of the present invention. In the illustrated embodiment, system environment 400 includes user input module 410, discovery module 420, model module 430, ranking module 440, and questions display module 450.

FIG. 4 further shows user 480 and dataset repository 490. User 480 can include any person (e.g., a business analyst, data scientist, credit lending manager, etc.) seeking to explore interesting data patterns in structured tables through recommending aggregate questions in a conversational data exploration. Dataset repository 490 can store any number of datasets which can be analyzed. The datasets stored in the dataset repository 490 can include many different formats, which may be manipulated using different data manipulation languages (e.g., SQL, Search Processing Language (SPL), HiveQL, Pig, Jaql, etc.). For instance, a dataset may be in a database format such that specific data may be retrieved by executing database queries (e.g., SQL queries) on the dataset. Also stored in the dataset repository 490 along with the datasets are descriptions, specifications, or metadata of the datasets (e.g., database schema) that describe the datasets. In some embodiments, the description of a dataset includes database schema, which specifies the structure of a database. A database schema defines the tables, the fields in each table, and the relationship between fields and tables when the dataset is stored in a relational database format. The functions of the modules shown in FIG. 4 will be described in greater detail with reference to FIG. 5.

Figure 5:
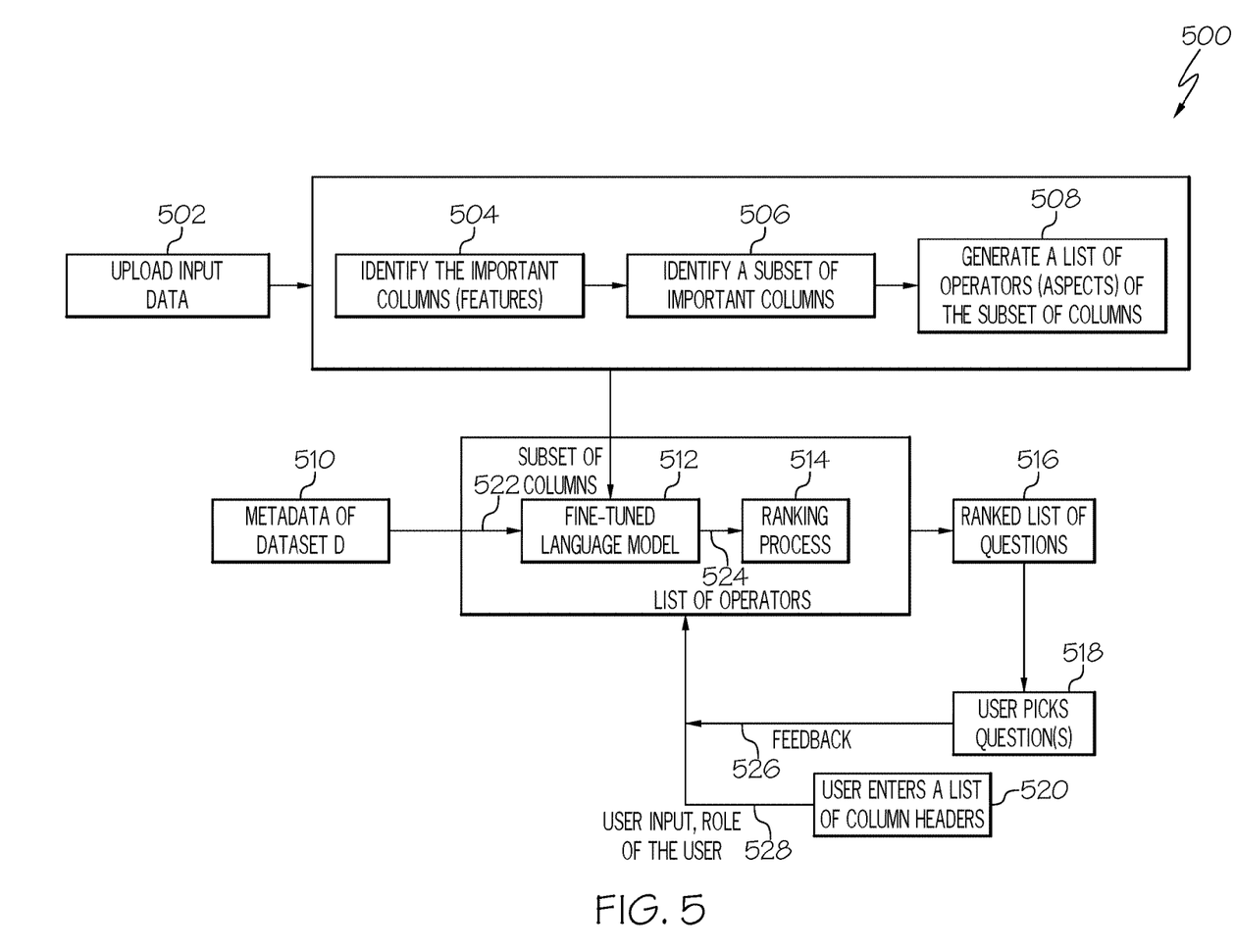
FIG. 5 depicts an example method to explore interesting data patterns in structured tables through recommending aggregate questions in a conversational data exploration, in accordance with an embodiment of the present invention.

FIG. 5 shows a method 500 divided into three phases (i.e., discovery phase, aggregate question generation phase, and ranking phase) to explore interesting data patterns in structured tables through recommending aggregate questions in a conversational data exploration. At 502, a user 480 uploads a dataset D with m columns which can be denoted by $\{c_1, c_2, \ldots, c_m\}$. User input module 410 is configured to receive the dataset from dataset repository 490 uploaded by the user 480. The discovery phase includes steps 504 to 508. At 504 and 506, discovery module 420 is configured to identify and choose the top K columns (K=1, 2, . . . , m) which are the important columns (or features) in dataset D. One method to determine the set of columns 522 is by computing a Fisher's score for each column. Fisher score is a typical supervised feature selection method. The scoring algorithm can return the ranks of the columns based on the Fisher's score in descending order. The set of columns 522 can then be selected based on the scoring. The number of columns selected can be based on a predefined threshold (e.g., all features that have a variance greater or equal to x, keep the top K columns with the largest variance, etc.).

At 508, discovery module 420 is configured to generate a list of important aspects (or operators) 524 related to the set of columns 522. An operator is generated for each column within the set of columns 522. An operator is generally a mapping or function that acts on elements of a space to produce elements of another space (possibly and sometimes required to be the same space). The list of operators which can be considered can include: average, minimum, maximum, more than, less than, above, below, top K percent, fraction, total, majority, minority, missing, outlier, after, before, within, and on. For each of these columns, discovery module 420 can determine an interestingness of each column or a combination of columns by computing entropy-based measures such as 'unalikeability' and/or the like to capture central tendencies such as dispersion, average, Q1, Q3, median, mode, and/or the like. Quartiles consist of Q1 (lowest quartile), Q2 (median), and Q3 (upper quartile). Unalikability is a measure of variation for categorical variables. It essentially measures the probability of drawing two non-equal values at random. Discovery module 420 can determine the portions of the important columns or the combination of the columns determined in the previous step which represent skewed data or the data that is significantly having a different pattern when compared with the overall distribution of the column or the combination of the columns. In other words, the important features are determined by computing Fisher score and the columns with large Fisher scores are chosen as important features. Within the subset of data formed by the important features interesting data slices are determined by computing the entropy over the data slices and the relevant operators are assigned for the aggregated outcome on the slice of the data.

Discovery module 420 can further determine a proportion of missing entries within each column and a proportion of outliers present within each column. An outlier is an observation that lies abnormally far away from other values in a dataset. Outliers can be problematic because they can affect the results of an analysis. One common way to find outliers in a dataset is to use the interquartile range. The interquartile range, often abbreviated IQR, is the difference between the 25th percentile (Q1) and the 75th percentile (Q3) in a dataset. It measures the spread of the middle 50% of values. One method is to declare an observation to be an outlier if it has a value 1.5 times greater than the IQR or 1.5 times less than the IQR.

Next is the aggregate question generation phase. The questions generated by the system are aggregate in nature in the sense that it forms the questions which aggregates an interesting data slice through operations such as computing mean, median, mode, standard deviation, coefficient variation, interquartile ranges, fractions, etc. These central measures computed over a slice of data makes the generated question to be an aggregate question formed based on the data slice.

Metadata exists for dataset D. Metadata is data that describes other data. Metadata consists of properties, which describe a dataset's entities, and their values. The metadata can include a description of the dataset. For example, dataset D can represent the credit card customers of XYZ Bank. The dataset can contain details about each customer such as age, gender, etc. The metadata might also include a title of the dataset, if available Model module 430 is configured to receive and pass the set of columns 522, the list of operators 524, and metadata 510 mentioned above through a pre-trained fine-tuned language model 512 (e.g., a T5 model) to generate one or more questions. T5, or Text-to-Text Transfer Transformer, is a transformer-based architecture that uses a text-to-text approach. Every task (including translation, question answering, and classification) is cast as feeding the model text as input and training it to generate some target text. Model module 430, using tools like Watson®, can learn (using a machine learning model) to generate a set of questions based on important features and important aspects which can be presented to user 480. (Watson is a trademark of International Business Machines in the U.S. and/or other countries).

For each category such as missing entries and outliers, a ranking is done based on a column or combination of columns having a larger proportion of missing entries or outliers (respectively) to the smaller proportion. For a ranking of the questions based on skewness, columns or the combination of the columns which has a larger unalikeability score are ranked higher to lower. The same process is used for ranking the questions with central measures such as average, median, Q1, Q3, and dispersions. For unalikeability, the measure equals $1-\Sigma_{x_i \in C(x)} p(x_i)^2$ where $p(x_i)$ which represents the fraction of entries within the category $x_i$.

Ranking module 440 is configured to perform a ranking process 514. At 516, a ranked top K recommended questions are displayed to the user 480 from each of the categories. To start with, each of the operators (e.g., average, minimum, maximum, more than, less than, above, below, top K percent, fraction, total, majority, minority, missing, outlier, after, before, within, on) have a same probability. Also, each of the columns in the dataset has the same probability of being chosen by the user 480. At 518, the user 480 chooses a set of questions from the list. Based on the questions chosen by the user 480, the operator within that has a higher probability and so is the column that is chosen by the user 480. After the user 480 chooses a first set of questions, an iterative process begins to generate additional questions. Hence, in the next iteration those questions with the operators having a larger probability are chosen along with the column having a larger probability based on the question chosen by the user 480 in the last iteration.

Through a search engine, at 520, the user 480 can insert some of the key terms such as column headers and generated questions are presented that contain those column headers. In a conversational setup, as the user starts writing a question the system can help the user autofill those questions based on the ranking of the questions. In that way, once a question is formed, feedback 526 is given by the user that how relevant such a question is to the user and based on the received feedback the system re-ranks the questions. In this way the system dynamically adapts to the user intent and improves the recommendation of interesting and relevant aggregated questions. The user 480 can also provide the role and/or responsibilities (e.g., user input, role of the user 528) of the user. To that end, interesting questions can be formed using relevant operators and important features which are ranked based on the user persona—roles, responsibilities, and intent. In this way the system could put a higher rank to the relevant questions and show those to the user with such a role, responsibility, and intent.

Figure 6:
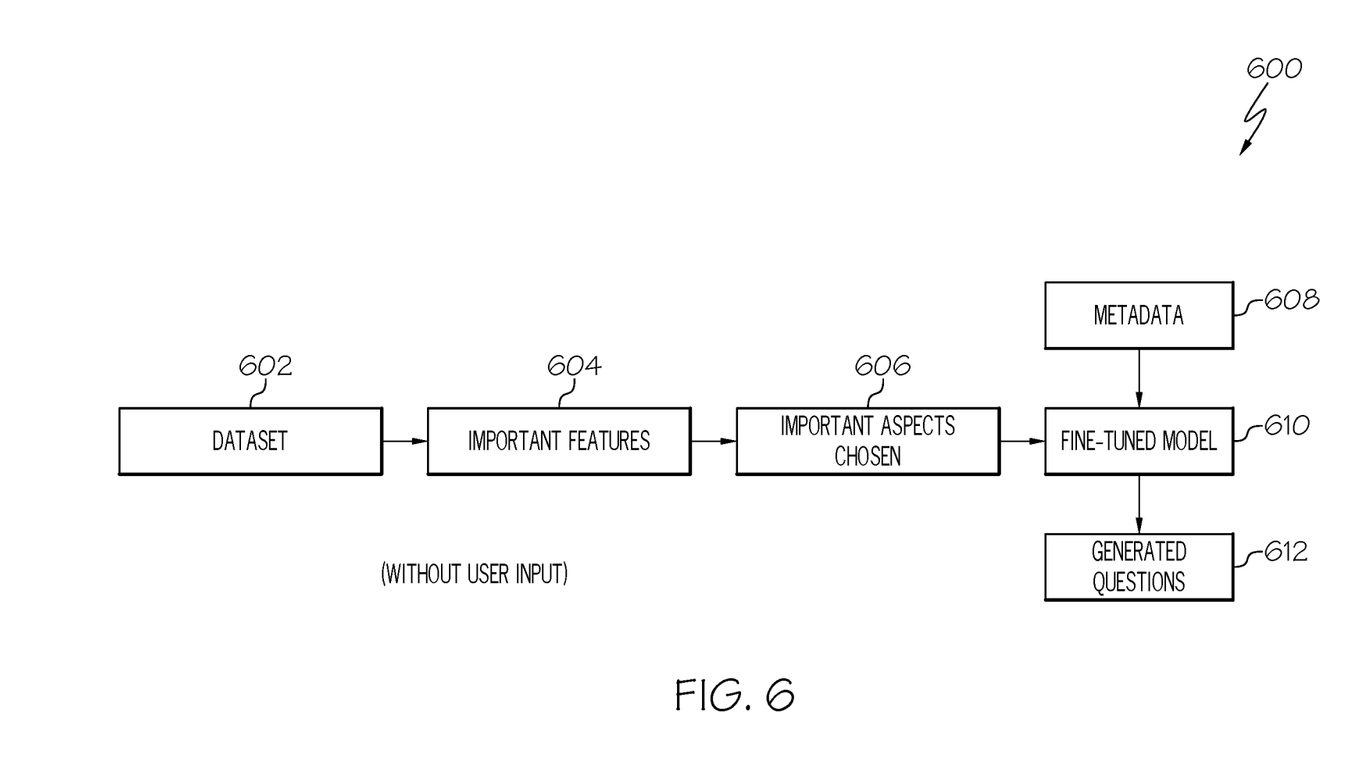
FIG. 6 depicts an example flow chart of a method for generating questions without user input, in accordance with an embodiment of the present invention.

FIG. 6 depicts a flow chart of a method 600 for generating questions without user input. At 602, a dataset includes age, salary, gender, marital status, etc. is received as input. At 604, the important columns/features are determined to include age, salary, and gender. At 606, the important aspects are chosen which include a distribution and average. At 608, the metadata for the dataset includes information that the dataset contains customer data on age, salary, gender, and marital status. At 610, a fine-tuned model receives the important features and aspects along with the metadata to generate questions (at 612). For example, "What is the average salary of the top 10% of customers?".

Figure 7:
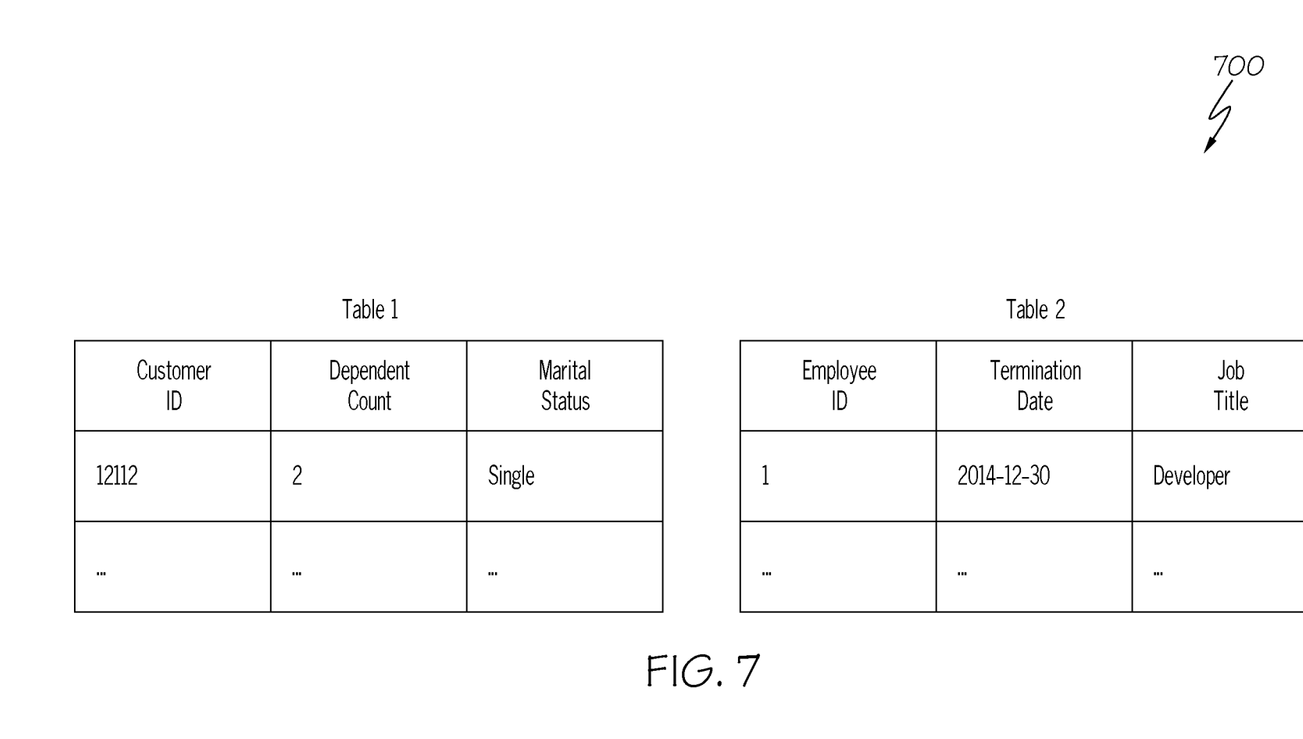
FIG. 7 depicts example databases involved in performing the inventive methods, in accordance with embodiments of the present invention.

FIG. 7 depicts example tables 700 for generating questions with user input according to an embodiment of the present invention. Table 1 includes columns customer ID, dependent count, and marital status. Sample questions which can be generated by the system described herein include: "What fraction of customers has a marital status of "Divorced?", "How many customers have a dependent count more than 6?", and "What is the maximum dependent count of customer?". Table 2 includes columns employee ID, termination date, and job title. Example generated questions can include: "What fraction of employees has a job tile of 'Developer'?" and "Which job title has a minimum number of employees?". As discussed, the proposed delivery mechanism is an artificial intelligence (AI) enabled system that explores data patterns and data fields across any number of datasets or tables through recommending aggregate questions based on user intent. Given a tabular dataset, a determination can be made as to what the relevant questions are that can be generated using the metadata of the dataset (e.g., such as column headers, description of the dataset, title of the dataset) in addition to the cell values in the dataset.

Figure 8:
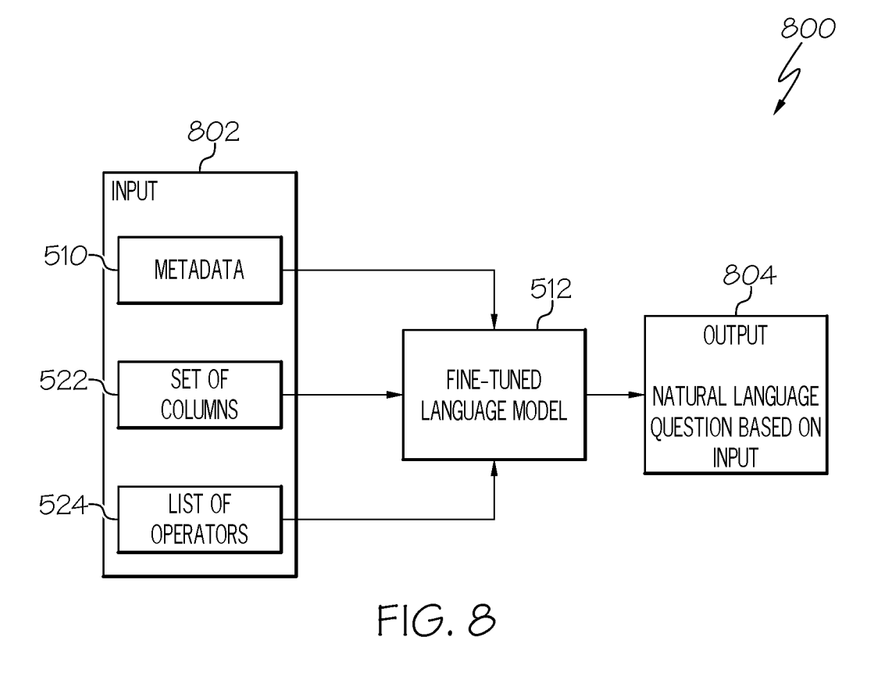
FIG. 8 depicts a detailed diagram of how a fine-tuned language model is utilized, in accordance with embodiments of the present invention.

FIG. 8 depicts a detailed diagram 800 of how a fine-tuned language model is utilized within an embodiment of the present invention. Input 802 includes metadata 510, a set of columns 522, and a list of operators 524. Input 802 is received into the fine-tuned model 512. Metadata 510 of the table can include a description of the table (e.g., table contains the columns age, gender, etc.) and a title of the dataset. A set of columns received by the model 512 can include a column type for each column within the set. For example, column 1 is 'Age' with column type of 'numerical', column 2 is 'gender' with column type of 'categorical', and column 3 is 'state' with column type of 'categorical'. A list of operators is also received by the model. For example, operator 1 is 'average', operator 2 is 'null', and operator 3 is 'within'. In an embodiment, the operators relate to the columns, respectively. Output 804 includes a natural language question using the columns and operators. For example, "What is the average age of gender X within state Y?".

Figure 9A:
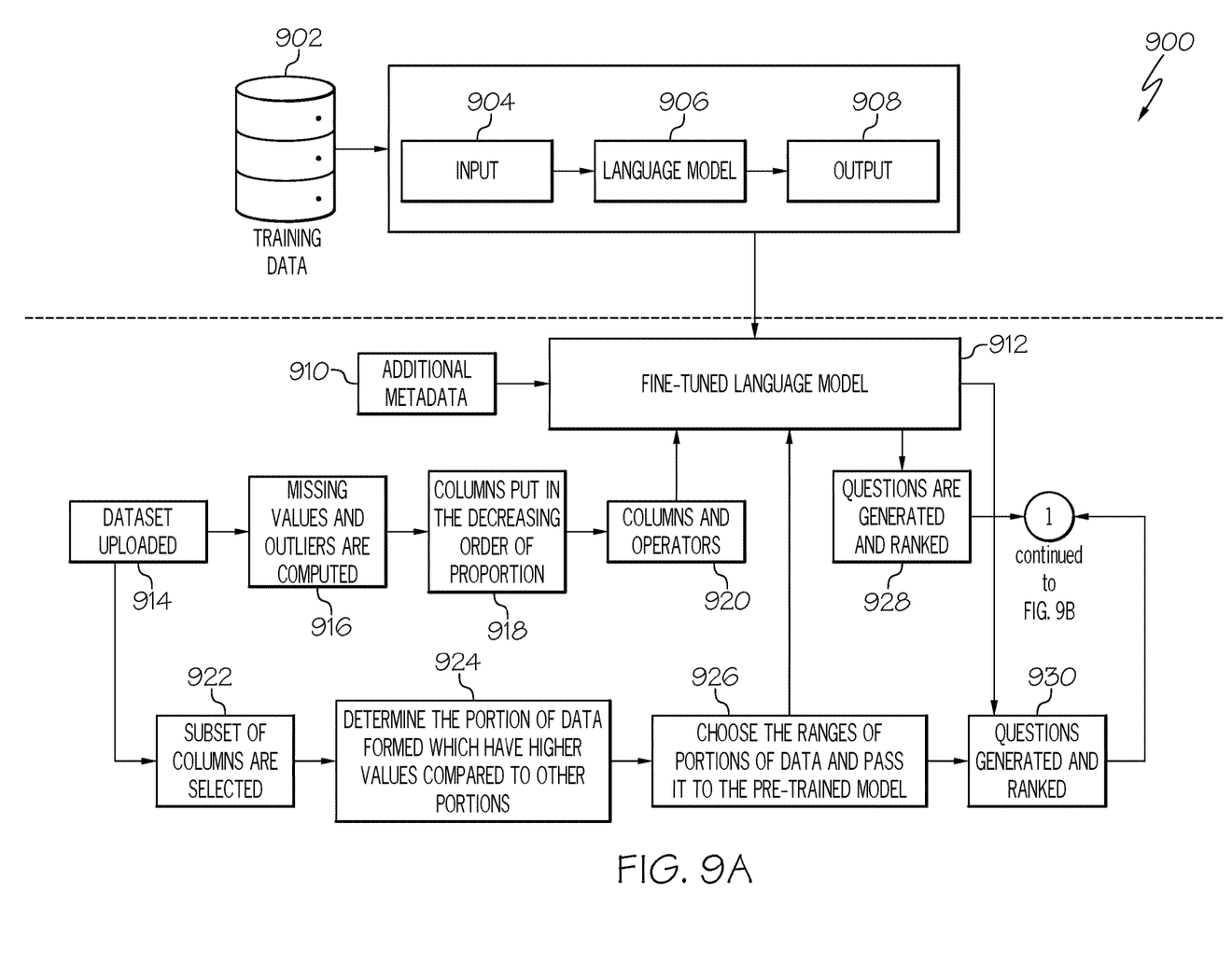
FIGS. 9*a-b* depict a detailed system flow diagram for exploring interesting data patterns in structured tables through recommending aggregate questions in a conversational data exploration, in accordance with embodiments of the present invention.
Figure 9B:
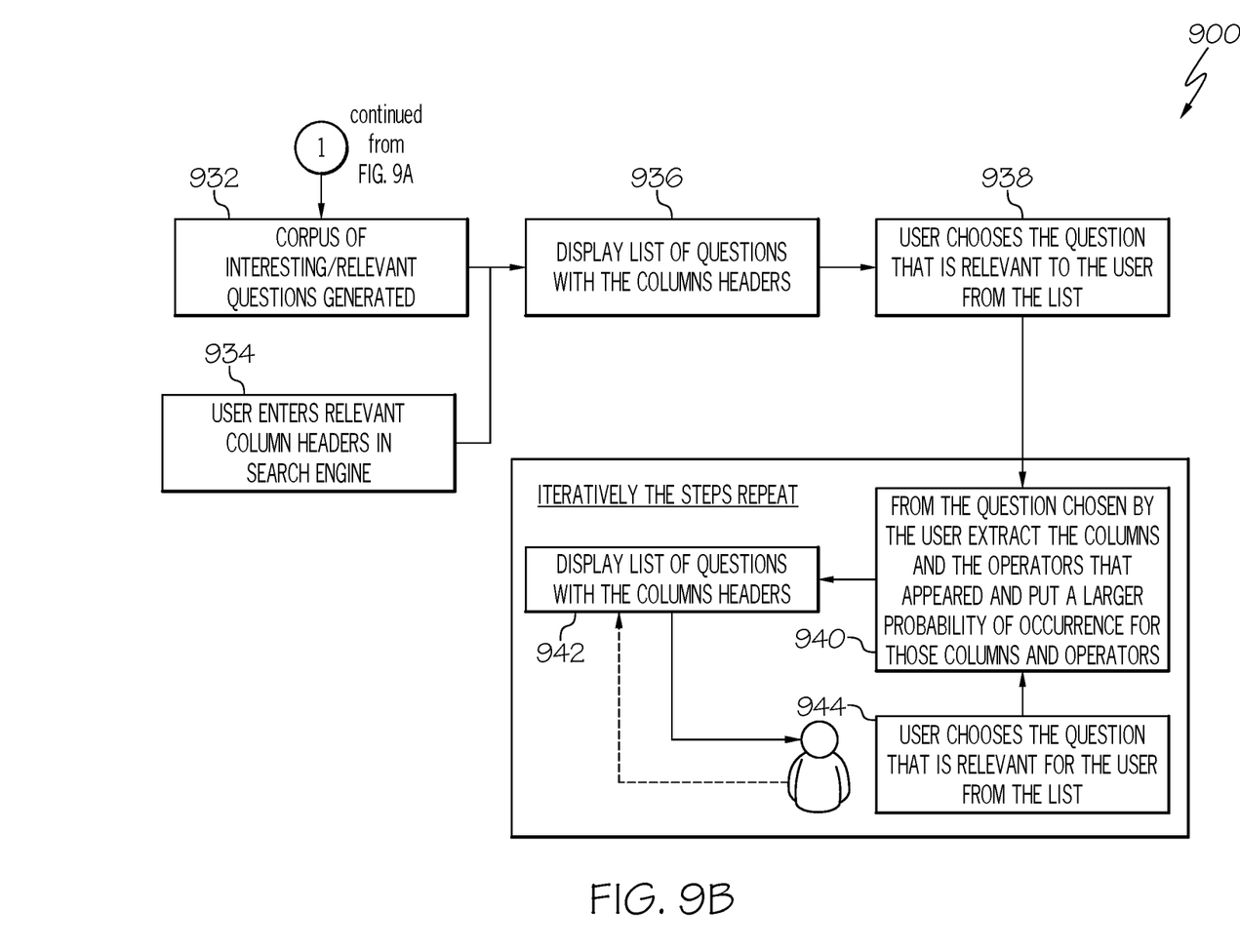

FIGS. 9A-B depict a detailed system flow diagram 900 for exploring interesting data patterns in structured tables through recommending aggregate questions in a conversational data exploration. The first step includes model training language mode 906 (e.g., a T5 model) using training data 902. Training data 902 can include a data set with each row being a description of dataset, a set of columns, column types, a set of operators and a question based on the columns and the operator. Input 904 can include a dataset description, a set of columns, column types, and a set of operators. Output 908 can include a question formed using the set of columns, column type and the set of operators.

The process of training language model 906 can involve providing a machine learning (ML) or learning algorithm with training data 902 to learn from. A fine-tuned language model can be created by the training process. The training data 902 must contain the correct answer, which is known as a target or target attribute. The learning algorithm finds patterns in the training data 902 that map the input 904 to the target or output 908, and it outputs a fine-tuned language model that captures these patterns.

At 910, additional metadata of the table (e.g., table description, column headers, title, etc.) is fed into fine-tuned language model 912. At 914, a dataset with m columns to be explored is upload by a user. At 916, for each column, the proportion of missing values and outliers are computed. Columns with a positive fraction of missing values/outliers are sorted in decreasing order by proportion, at 918. At 920, columns are passed along with the operators to fine-tuned language model 912. Also, a subset of top K columns from 914 is selected (e.g., based on a Fisher score), at 922. At 924, based on the K columns, entropy-based measures are used to determine the portion of data formed from K columns which have higher values compared to other portions (e.g., based on a predefined threshold). At 926, a range of the portions of data with the highest entropy-based scores, columns, and operators are passed to the fine-tuned language model 912. At 928, questions are generated from fine-tuned language model 912 and ranked in the decreasing order of the proportions of missing values/outliers. At 930, questions are generated from 912 and 926 and ranked based on the decreasing value of the entropy-based score of each. An entropy score quantifies the amount of uncertainty (or surprise) involved in the value of a random variable or the outcome of a random process.

At 932, a corpus of interesting/relevant questions are generated based on the dataset. At 934, the user enters relevant column headers into a search engine. A list of questions with the column headers is presented to the user, at 936. At 938, the user chooses any number of questions that are relevant for the user from the presented list. Based on the questions chosen by the user, the operator within that has a higher probability and so is the column that is chosen by the user, at 940. Hence, in the next iteration at 942, those questions with the operators having a larger probability are chosen along with the column having a larger probability based on the question chosen by the user in the last iteration, at 944.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for retrieving data in a conversational data exploration, comprising:
   (a) calculating, by a processor, an importance score for each column within a dataset;
   selecting, by the processor, a set of the columns based on the importance score of each column;
   (b) generating, by the processor, a list of operators, wherein generating the list of operators includes:
      determining Fisher scores for each column, and designating columns having a Fisher score above a threshold as part of a subset of data,
      for the subset of data, calculating entropy values for a plurality of data slices of the subset of data, and
      generating, for each column within the set of columns, the list of operators based on the Fisher scores and the calculated entropy values;
   (c) generating, by the processor, a set of natural language questions based on the set of columns, the list of operators, and metadata related to the dataset;
   (d) receiving a set of user selected questions from the set of natural language questions;
   (e) calculating, by the processor, a ranking score for each question within the set of natural language questions using an entropy-based scoring method and based on the set of user selected questions;
   (f) ranking, by the processor, the set of natural language questions based on each ranking score;
   (g) presenting to the user, by the processor, a set of relevant questions from the set of natural language questions based on a predefined threshold;
   (h) receiving another set of user selected questions from the set of relevant questions; and
   (i) repeating (e) through (g) at least once.

2. The method of claim 1, wherein the importance score of each column is calculated based on a role, responsibility, or intent of a user.

3. The method of claim 1, wherein the metadata includes a set of column headers, a description, and a title related to the dataset.

4. The method of claim 1, further comprising receiving, by the processor, a set of column headers from a user related to the dataset.

5. The method of claim 4, further comprising presenting, by the processor, a subset of questions from the set of relevant questions based on the set of column headers.

6. The method of claim 1, wherein the list of operators includes at least one of average, minimum, maximum, more than, less than, above, below, top K percent, fraction, total, majority, minority, missing, outlier, after, before, and within.

7. A computing system for retrieving data in a conversational data exploration, comprising:
- a processor;
- a memory device coupled to the processor; and
- a computer readable storage device coupled to the processor, wherein the storage device contains program code executable by the processor via the memory device to implement a method, the method comprising:
  - (a) calculating, by a processor, an importance score for each column within a dataset;
  - selecting, by the processor, a set of the columns based on the importance score of each column;
  - (b) generating, by the processor, a list of operators, wherein generating the list of operators includes:
    - determining Fisher scores for each column, and designating columns having a Fisher score above a threshold as part of a subset of data,
    - for the subset of data, calculating entropy values for a plurality of data slices of the subset of data, and
    - generating, for each column within the set of columns, the list of operators based on the Fisher scores and the calculated entropy values;
  - (c) generating, by the processor, a set of natural language questions based on the set of columns, the list of operators, and metadata related to the dataset;
  - (d) receiving a set of user selected questions from the set of natural language questions;
  - (e) calculating, by the processor, a ranking score for each question within the set of natural language questions using an entropy-based scoring method and based on the set of user selected questions;
  - (f) ranking, by the processor, the set of natural language questions based on each ranking score;
  - (g) presenting to the user, by the processor, a set of relevant questions from the set of natural language questions based on a predefined threshold;
  - (h) receiving another set of user selected questions from the set of relevant questions; and
  - (i) repeating (e) through (g) at least once.

8. The computing system of claim 7, wherein the importance score of each column is calculated based on a role, responsibility, or intent of a user.

9. The computing system of claim 7, wherein the metadata includes a set of column headers, a description, and a title related to the dataset.

10. The computing system of claim 7, further comprising receiving, by the processor, a set of column headers from a user related to the dataset.

11. The computing system of claim 10, further comprising presenting, by the processor, a subset of questions from the set of relevant questions based on the set of column headers.

12. The computing system of claim 7, wherein the list of operators includes at least one of average, minimum, maximum, more than, less than, above, below, top K percent, fraction, total, majority, minority, missing, outlier, after, before, and within.

13. A computer program product for retrieving data in a conversational data exploration, the computer program product comprising a computer readable storage device, and program instructions stored on the computer readable storage device, to:
- (a) calculate, by a processor, an importance score for each column within a dataset;
- selecting, by the processor, a set of the columns based on the importance score of each column;
- (b) generate, by the processor, a list of operators, wherein generating the list of operators includes:
  - determining Fisher scores for each column, and designating columns having a Fisher score above a threshold as part of a subset of data,
  - for the subset of data, calculating entropy values for a plurality of data slices of the subset of data, and
  - generating, for each column within the set of columns, the list of operators based on the Fisher scores and the calculated entropy values;
- (c) generate, by the processor, a set of natural language questions based on the set of columns, the list of operators, and metadata related to the dataset;
- (d) receive a set of user selected questions from the set of natural language questions;
- (e) calculate, by the processor, a ranking score for each question within the set of natural language questions using an entropy-based scoring method and based on the set of user selected questions;
- (f) rank, by the processor, the set of natural language questions based on each ranking score;
- (g) present to the user, by the processor, a set of relevant questions from the set of natural language questions based on a predefined threshold;
- (h) receive another set of user selected questions from the set of relevant questions; and
- (i) repeat (e) through (g) at least once.

14. The computer program product of claim 13, wherein the importance score of each column is calculated based on a role, responsibility, or intent of a user.

15. The computer program product of claim 13, wherein the metadata includes a set of column headers, a description, and a title related to the dataset.

16. The computer program product of claim 13, further comprising program instructions stored on the computer readable storage device to receive, by the processor, a set of column headers from a user related to the dataset.

17. The computer program product of claim 16, further comprising program instructions stored on the computer readable storage device to present, by the processor, a subset of questions from the set of relevant questions based on the set of column headers.

* * * * *